United States Patent [19]

Takeo et al.

[11] Patent Number: 4,903,310
[45] Date of Patent: Feb. 20, 1990

[54] METHOD OF AUTOMATICALLY DETERMINING IMAGED BODY POSTURE IN MEDICAL IMAGE DISPLAY

[75] Inventors: Hideya Takeo; Nobuyuki Tanaka; Nobuyoshi Nakajima, all of Kanagawa, Japan

[73] Assignee: Fuji Photo Film Co. Ltd., Kanagawa, Japan

[21] Appl. No.: 183,954

[22] Filed: Apr. 20, 1988

[30] Foreign Application Priority Data

| Apr. 20, 1987 | [JP] | Japan | 62-96701 |
| Apr. 20, 1987 | [JP] | Japan | 62-96702 |
| Apr. 20, 1987 | [JP] | Japan | 62-96703 |
| Apr. 20, 1987 | [JP] | Japan | 62-96704 |
| Apr. 20, 1987 | [JP] | Japan | 62-96705 |
| Apr. 20, 1987 | [JP] | Japan | 62-96706 |

[51] Int. Cl.$^4$ .............................. G03B 41/00
[52] U.S. Cl. .................... 382/6; 364/413.13; 382/39; 382/51; 382/30; 382/29
[58] Field of Search ............ 364/413.13, 413.18; 382/6, 18, 29, 51, 54, 39, 30

[56] References Cited

U.S. PATENT DOCUMENTS 4,466,122  8/1984  Auerbach ........................... 382/29
4,504,972  3/1985  Scherl ............................... 382/51
4,688,088  8/1987  Hamazaki ......................... 382/18

FOREIGN PATENT DOCUMENTS

0200379 11/1984 Japan ................................ 382/18
 134886  6/1986 Japan ................................ 382/46
0193004  8/1986 Japan ................................ 382/18
0239376 10/1986 Japan ................................ 382/18

Primary Examiner—Reinhard J. Eisenzopf
Assistant Examiner—Jose M. Solis
Attorney, Agent, or Firm—Sughrue, Mion, Zinn, Macpeak & Seas

[57] ABSTRACT

An accumulative histogram of an image signal bearing a transmitted image of a human body is generated. The rate of change of the accumulative histogram is determined in a predetermined region of the image, and the imaged posture of the image is determined from the rate of change. Alternatively, to determine the imaged posture, the separation of a histogram is determined, or the pattern of the histogram is compared with a plurality of reference histogram patterns. The derivative of second order of a function approximated by the histogram pattern may be checked for its sign, or the histogram may be checked to determine whether it is of a single-peak form or a double-hump form. The dispersion of the histogram may also be determined.

6 Claims, 10 Drawing Sheets

METHOD OF AUTOMATICALLY DETERMINING IMAGED BODY POSTURE IN MEDICAL IMAGE DISPLAY

BACKGROUND OF THE INVENTION

1. Field of the Invention

The present invention relates to a method of automatically determining the posture of an imaged human body in a medical imaging system such as a radiation imaging system.

2. Description of the Prior Art

A certain phosphor, when exposed to a radiation such as X-rays, $\alpha$-rays, $\beta$-rays, $\gamma$-rays, cathode rays, or ultraviolet rays, stores a part of the energy of the radiation. When the phosphor exposed to the radiation is exposed to stimulating rays such as visible light, the phosphor emits light (stimulated emission) in proportion to the stored energy of the radiation. Such a phosphor is called a stimulable phosphor.

There has been proposed a radiation image recording and reproducing system employing such a stimulable phosphor. In the proposed radiation image recording and reproducing system, the radiation image information of an object such as a human body is recorded on a sheet having a layer of stimulable phosphor, and then the stimulable phosphor sheet is scanned with stimulating rays such as a laser beam to cause the stimulable phosphor sheet to emit light representative of the radiation image. The emitted light is then photoelectrically detected to produce an image signal that will be recorded as a visible image of the object on a recording medium such as a photographic material or displayed as a visible image on a CRT or the like (see Japanese Laid-Open Patent Publications Nos. 55-12429 and 56-11395, for example).

The radiation image recording and reproducing system is highly advantageous over conventional radiographic systems employing silver-salt photographs in that images can be recorded in a very wide range of radiation exposure. More specifically, it is known that the amount of light emitted from stimulable phosphor upon exposure to stimulating rays is proportional to the amount of radiation to which the stimulable phosphor has been exposed, in a highly wide range. Even if the amount of radiation exposure varies greatly under various imaging conditions, a read-out gain is set to a suitable level, and the amount of light emitted from a stimulable phosphor sheet is read and coverted into an electric signal by a photoelectric transducer. The electric signal is processed to produce a visible radiation image which is recorded on a recording medium such as photographic material or displayed as a visible image on a CRT or the like. By selecting a suitable read-out gain setting, the radiation image can be obtained which is not affected by variations in the amount of radiation exposure.

In the radiation image recording and reproducing system, in order to eliminate influences due to varying imaging conditions or obtain a radiation image which can well be observed, "recording information" indicating either a recording condition in which the radiation image information is recorded on a stimulable phosphor sheet or a recording pattern determined by the area of an object to be imaged such as a chest or a stomach, and an imaging process such as a simple imaging process or a contrast radiographic process, is reviewed prior to the output of a visible image to be observed. Then, the read-out gain is adjusted to a suitable level based on the recording information, and a recording scale factor is determined in order to optimize the resolution according to the contrast of the recording pattern. Where the image signal which is read out is processed such as for gradation processing, image processing conditions should be optimized.

One known process of reviewing recording information of a radiation image prior to the output of a visible image is disclosed in Japanese Laid-Open Patent Publication No. 58-67240. According to this known process, stimulating light having a level lower than the level of stimulating light to be applied in a "main reading mode" for obtaining a visible image to be observed is used to read, in a "preliminary reading mode", the recording information of a radiation image stored on a stimulable phosphor sheet prior to the main reading mode. In the preliminary reading mode, the condition in which the radiation image is recorded can roughly be understood. For effecting the main reading mode, the read-out gain is suitably adjusted, and the recording scale factor is determined, or image processing conditions are selected, on the basis of the information obtained in the preliminary reading mode.

According to the above conventional method, the recording condition and recording pattern of the radiation image information recorded on the stimulable phosphor sheet can be known prior to the main reading mode. Therefore, even if a reading system having a very wide dynamic range is not relied upon, a radiation image that can well be observed can be produced by adjusting the read-out gain to a suitable level and determining the recording scale factor based on the recording information, and processing an electric signal generated in the main reading mode according to the recording pattern.

Figure 2A:
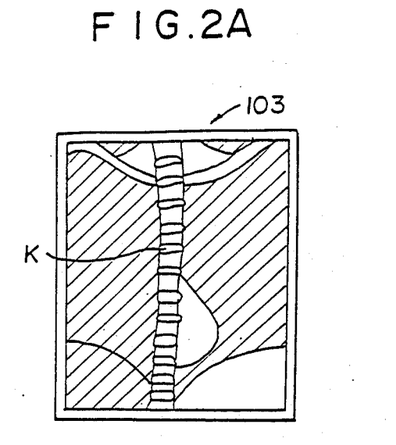
FIGS. 2A and 2B are views of radiation images showing different imaged postures of an object.
Figure 2B:
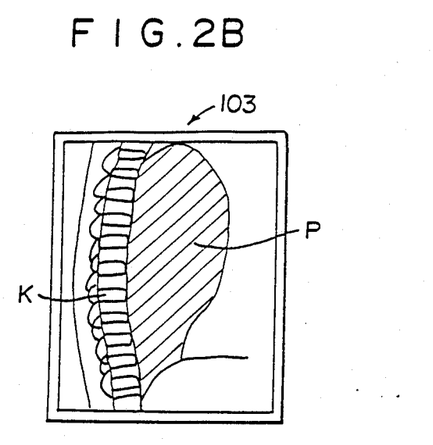

Once the reading conditions and/or the image processing conditions of the radiation image information are thus determined, the densities of areas of interest in reproduced images of an object may vary from each other when the object is imaged at different postures. More specifically, in order to diagnose the thoracic vertebra of a patient, the chest is imaged from its front side as shown in FIG. 2A of the accompanying drawings and from a lateral side thereof as shown in FIG. 2B. When the chest is imaged from its front side as shown in FIG. 2A, the area of interest or the thoracic vertebra K overlaps the mediastinum which is less permeable to radiation. Therefore, the amount of radiation stored in the area of the stimulable phosphor sheet corresponding to the thoracic vertebra is low, and the amount of light which will later be emitted from this area is also low. When the chest is laterally imaged as shown in FIG. 2B, the thoracic vertebra K lies over the lung P which is more permeable to radiation. Consequently, the amount of radiation stored in the area of the stimulable phosphor sheet corresponding to the thoracic vertebra is high, and the amount of light which will later be emitted from this area is also high. Since the maximum value Smax and the minimum value Smin of an image signal read from the stimulable phosphor sheet remain substantially unchanged regardless of whether the chest is imaged from its front side or lateral side, the reading conditions and/or the image processing conditions which are determined on the maximum value Smax and the minimum value Smin are substantially the same when the chest is imaged from its front side and lateral side. When a radiation image is reconstructed in the main reading mode under these reading and/or image processing conditions, therefore, the imaged thoracic vertebra is of a relatively low density when it is imaged front its front side, and of a relatively high density when it is imaged from its lateral side.

Figure 11A:
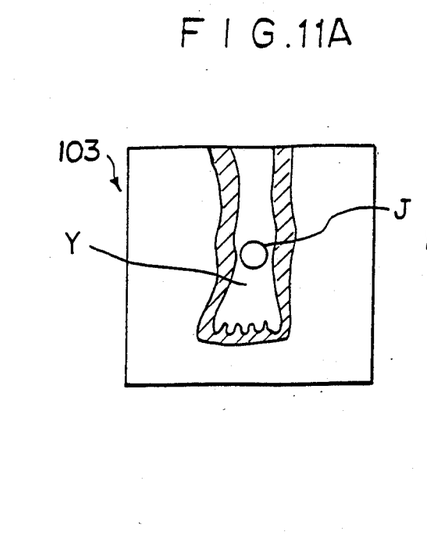
FIGS. 11A and 11B are views of other radiation images showing different imaged postures of an object.
Figure 11B:
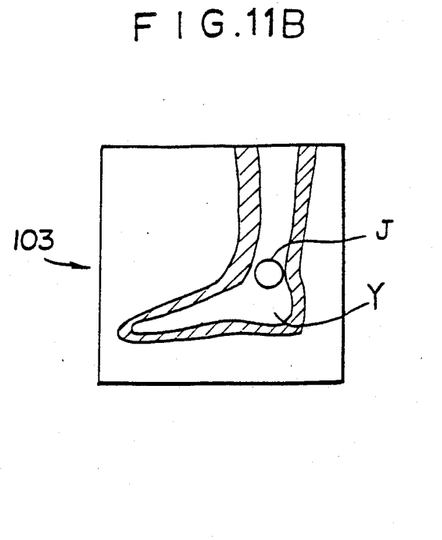

The same problems may be caused for other reasons than those described above. For example, in order to diagnose a joint J in a foot, the foot is imaged from its front side as shown in FIG. 11A and from a lateral side thereof as shown in FIG. 11B. When the foot is imaged from its front side as shown in FIG. 11A, the heel Y overlaps the long bones from the instep to the toes which are less permeable to radiation. Therefore, the amount of radiation stored in the area of the stimulable phosphor sheet corresponding to the heel is low. The amount of light which will later be emitted from this area is lower than the amount of light which will be emitted from the area of interest or the joint J. When the foot is laterally imaged as shown in FIG. 11B, the heel Y does not lie over the instep and the toes of the foot. Consequently, the amount of radiation stored in the area of the stimulable phosphor sheet corresponding to the heel as imaged from the side is higher than the amount of radiation stored in the area of the heel as imaged from the front. The amount of light which will later be emitted from the area of the heel as imaged from the side is substantially the same as the amount of light that will be emitted from the area of the joint J as imaged from the side. Since the minimum value Smin of an image signal read from the stimulable phosphor sheet for the front foot image is lower than the minimum value of an image signal read for the side foot image, when images are read and reproduced under the reading conditions and/or the image processing conditions which are determined on the maximum value Smax and the minimum value Smin, the imaged foot joint is of a relatively high density when it is imaged from its front side, and of a relatively low density when it is imaged from its lateral side.

It may be possible to dispense with the preliminary reading mode, and establish image processing conditions appropriately based on an image signal read in the main reading mode. However, the above drawbacks are also experienced with such an alternative.

To solve the aforesaid problems, it has been customary to enter information indicating what posture the object is taking while it is being imaged, into an image reading device or an image processing device, when radiation image information is read from a stimulable phosphor sheet, and to establish reading conditions and/or image processing conditions based on the entered posture information.

However, it has been highly tedious and timeconsuming to enter posture information each time radiation image information is to be read from a stimulable phosphor sheet. In addition, the operator may enter wrong posture information in error.

SUMMARY OF THE INVENTION

It is an object of the present invention to provide a method of automatically determining the imaged posture of an object image which is recorded on a stimulable phosphor sheet, for example, for medical purposes.

According to the present invention, there is provided a first method of determining the imaged posture of a medical image, comprising the steps of generating an accumulative histogram of an image signal bearing a transmitted image of a human body, determining a rate of change of the accumulative histogram in a predetermined region, and determining the imaged posture of the image based on the rate of change.

According to the present invention, there is provided a second method of determining the imaged posture of a medical image, comprising the steps of generating a histogram of an image signal bearing a transmitted image of a human body, determining the separation of the histogram, and determining the imaged posture of the image based on the separation.

According to the present invention, a third method of determining the imaged posture of a medical image, comprises the steps of generating a histogram of an image signal bearing a transmitted image of a human body, determining the degree of matching between a pattern of the histogram and a plurality of reference image signal histogram patterns predefined of imaged postures of the image, and determining the imaged posture of the image based on the degree of matching.

The degree of matching between the signal distribution pattern and the reference signal distribution pattern can be checked by any of various known pattern matching processes.

According to the present invention, a fourth method of determining the imaged posture of a medical image, comprises the steps of generating a histogram of an image signal bearing a transmitted image of a human body, determining a function approximating a pattern of the histogram, thereafter, determining a derivative of second order of the function, checking whether the derivative of second order is of a positive or negative value in a predetermined region in the image, and determining the imaged posture of the image based on whether the derivative of second order is of a positive or negative value.

According to the present invention, there is provided a fifth method of determining the imaged posture of a medical image, comprising the steps of generating a histogram of an image signal bearing a transmitted image of a human body, detecting whether the histogram is basically of a single-peak form or a double-hump form, and determining the imaged posture of the image based on whether a pattern of the distribution is basically of a single-peak form or a double-hump form.

According to the present invention, a sixth method of determining the imaged posture of a medical image, comprises the steps of generating an a histogram of an image signal bearing a transmitted image of a human body, determining the dispersion of the histogram, wholly or partly, and determining the imaged posture of the image based on the dispersion.

Figure 3A:
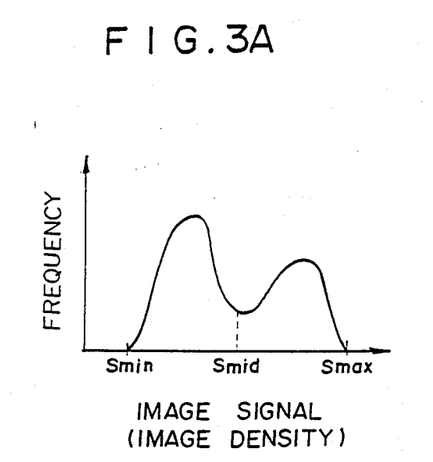
FIGS. 3A and 3B are graphs showing histograms of image signals read from stimulable phosphor sheets recording images of an object imaged at different postures.
Figure 3B:
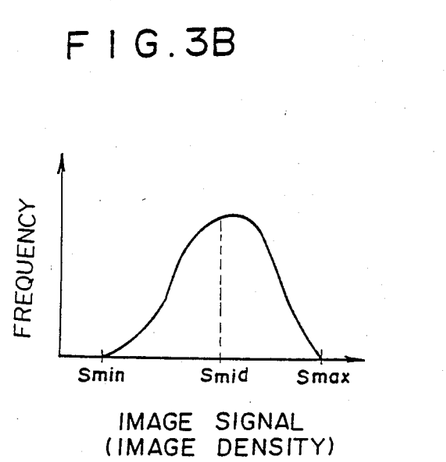
Figure 4A:
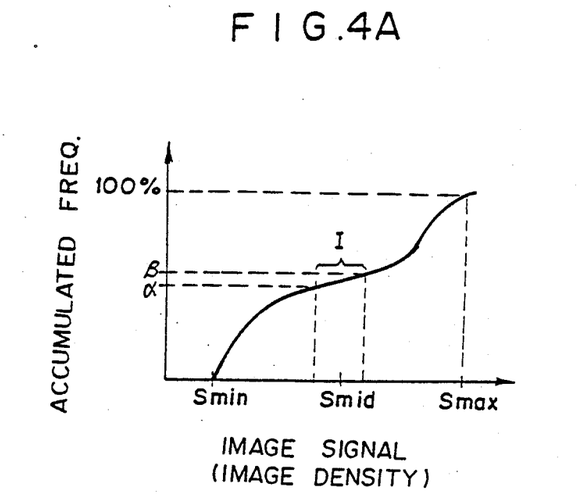
FIGS. 4A and 4B are graphs showing accumulative histograms of image signals according to a first method of the present invention.
Figure 4B:
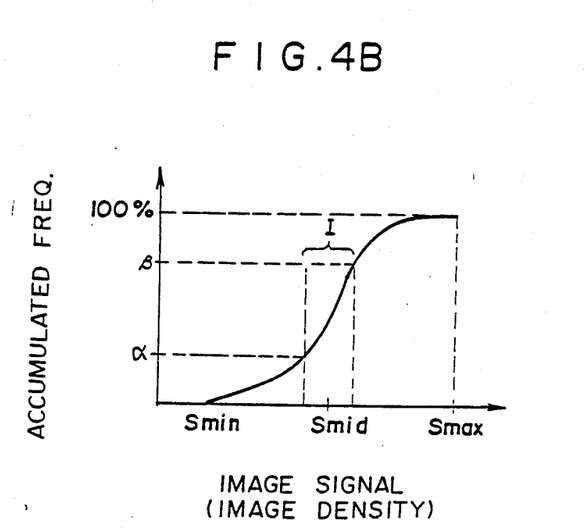

A front chest image which is taken by imaging the chest from its front side has an image signal histogram substantially as shown in FIG. 3A, and a side chest image which is taken by imaging the chest from its lateral side has an image signal histogram substantially as shown in FIG. 3B. Accumulative histograms, which are used in the first method of the present invention, are as shown in FIGS. 4A and 4B for the front and side chest images. The rate of change of the accmulative histogram in the vicinity of the middle signal value is considerably small for the accumulative histogram of FIG. 4A, and is considerably large for the accumulative histogram of FIG. 4B. Therefore, if the rate of change of the accumulative histogram is relatively small, the chest image can be judged as the front chest image, and if the rate of change of the accumulative histogram is relatively large, the chest image can be judged as the side chest image.

The pattern of the histogram shown in FIG. 3A has high frequency values relatively close to minimum and maximum signal values Smin, Smax, whereas pattern of the histogram shown in FIG. 3B has high frequency values near the middle signal value Smid.. The separation, used in the second method of the invention, of the histogram of FIG. 3A is larger than the separation of the histogram of FIG. 3B. If, therefore, the separation of the histogram is relatively large, the image can be determined as the front chest image, and if the separation of the histogram is relatively small, the image can be determined as the side chest image.

The histogram patterns as shown in FIGS. 3A and 3B, which are used in the third method of invention, are stored in advance in a memory means respectively as a reference histogram pattern for front chest images and a reference histogram pattern for side chest images. The degree of matching bewteen a histogram pattern of an image signal bearing a front chest image or a side chest image and the above two reference histogram patterns. If the histogram of the image signal better matches the reference histogram pattern shown in FIG. 3A than the reference histogram pattern shown in FIG. 3B, then the image borne by the image signal is judged as the front chest image. If image signal histogram pattern matches the reference histogram pattern of FIG. 3B better than the reference histogram pattern of FIG. 3A, then the image borne by the image signal is judged as the side chest image.

When the histogram patterns as shown in FIGS. 3A and 3B are approximated by a function used in the fourth method of the invention, the derivative of second order of the function is of a positive value in a region in which the function or the histogram pattern is downwardly convex, and the derivative of second order of the function is of a negative value in a region in which the function or the histogram pattern is upwardly convex. The histogram pattern shown in FIG. 3A is downwardly convex in the vicinity of the middle signal value Smid, and the histogram pattern shown in FIG. 3B is upwardly convex in the vicinity of the middle signal value Smid. The derivative of second order is checked for its sign in the region near the middle signal value Smid. If the derivative of second order is positive, then the chest image is determined as the front chest image, and if the derivative of second order is negative, then the chest image is determined as the side chest image.

Moreover, the histogram as shown in FIG. 3A is basically of a double-hump form having higher frequency values relatively close to the minimum and maximum signal values Smin, Smax, whereas the histogram as shown in FIG. 3B is basically of a single-peak form having higher frequency values close to the middle signal value Smid. Therefore, if the histogram is basically of a double-hump form, the chest image is determined as the front chest image, and if the histogram is basically of a single-peak form, the chest image is determined as the side chest image.

Figure 12A:
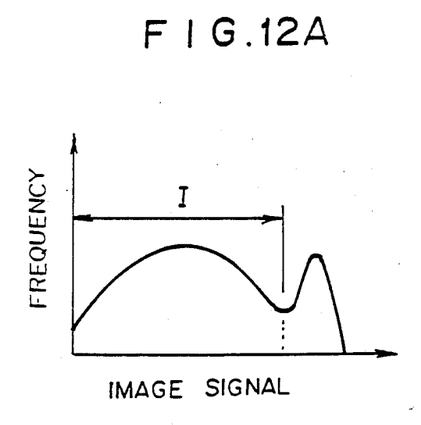
FIGS. 12A and 12B are graphs showing other histograms of image signals read from stimulable phosphor sheets recording images of an object imaged at different postures.
Figure 12B:
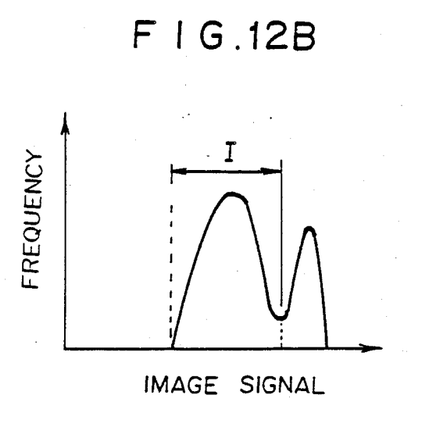

The radiation image of a foot, for example, of a human being which is taken from its front side has an image signal histogram substantially as shown in FIG. 12A, and the radiation image of the foot which is taken from its lateral side has an image signal histogram substantially as shown in FIG. 12B. The front foot image includes an area less permeable to the radiation than the side foot image. Therefore, the histogram of the front foot image has a wide distribution of low image signal values. The dispersion, used in the sixth method of the invention, is larger in the histogram of the front foot image than in histogram of the side foot image. Accordingly, if the dispersion is relatively large, the image is determined as the front foot image, and if the dispersion is relatively small, the image is judged as the side foot image.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
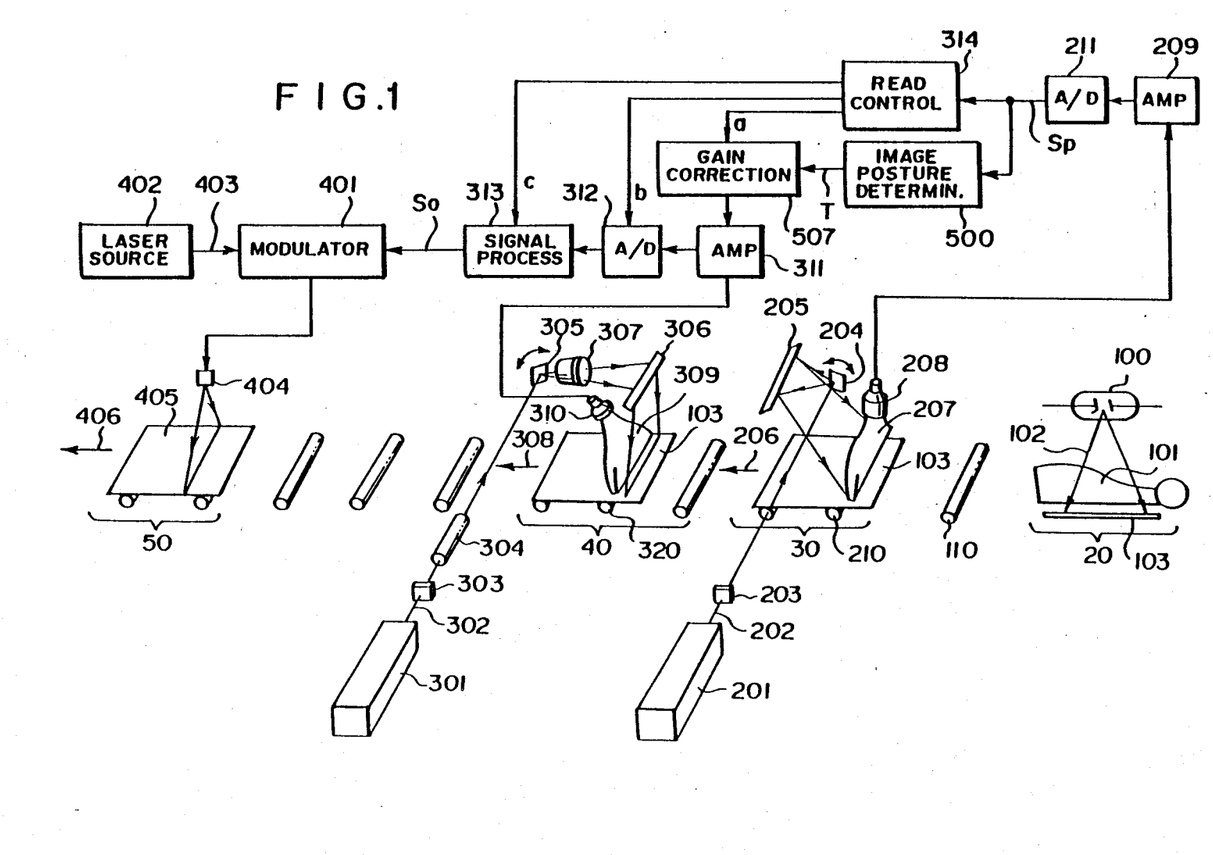
FIG. 1 is a schematic perspective view, partly in block form, of a radiation image recording and reproducing system for determining an imaged posture according to a method of the present invention.

FIG. 1 shows, by way of example, a radiation image recording and reproducing system for determining an imaged posture of a human body according to a method of a first embodiment of the present invention. The radiation image recording and reproducing system basically comprises a radiation image generating unit 20, a preliminary reading unit 30, a main reading unit 40, and an image reproducing unit 50. In the radiation image generating unit 20, a radiation 102 is emitted from a radiation source 100 such as an X-ray tube toward an object 101 such as a human body under examination.

The radiation 102 passes through the object 101 and is then applied to a stimulable phosphor sheet 103 capable of storing radiation energy for thereby recording the transmitted-radiation image information of the object 101 on the stimulable phosphor sheet 103.

The stimulable phosphor sheet 103 with the transmitted-radiation image information of the object 101 being recorded thereon is then fed to the preliminary reading unit 30 by a sheet feed means 110 such as a feed roller. In the preliminary reading unit 30, a laser beam 202 emitted from a preliminary reading laser source 201 passes through a filter 203 which cuts off the wavelength range of light which will be emitted from the stimulable phosphor sheet 103 upon exposure to the laser beam 202, and then is linearly deflected in a main scanning direction by a light deflector 204 such as a galvanometer mirror, after which the laser beam 202 is reflected by a plane mirror 205 onto the stimulable phosphor sheet 103. The laser beam 202 emitted as stimulating light from the laser source 201 has a waveform range selected so as not to overlap the waveform range of light emitted from the stimulable phosphor sheet 103. The stimulable phosphor sheet 103 is simultaneously fed for auxiliary scanning in the direction of the arrow 206 by a sheet feed means 210 such as feed rollers. As a result, the laser beam 202 is applied two-dimensionally to the entire surface of the stimulable phosphor sheet 103. The intensity of the laser beam 202 emitted from the laser source 201, the diameter of the laser beam 202, the scanning speed of the laser beam 202, and the speed of travel of the stimulable phosphor sheet 103 in the auxiliary scanning direction are selected so that the energy of the stimulating light (laser beam 202) in the preliminary reading mode will be lower than the energy of stimulating light emitted in a main reading mode (described later).

When the laser beam 202 is applied to the stimulable phosphor sheet 103 in the preliminary reading unit 30, the stimulable phosphor sheet 103 gives off light in an amount proportional to the amount of radiation energy stored therein, and the emitted light enters a preliminary reading light guide 207. The light is guided by the light guide 207 to reach a light detector 208 such as a photomultiplier. The light detector 207 has a light detecting surface to which there is attached a filter that passes only the wavelength range of the emitted light from the stimulable phosphor sheet 103 but cuts off the wavelength range of the stimulating light from the laser source 201. Therefore, the light detector 207 can detect only the light emitted from the stimulable phosphor sheet 103. The detected light is then converted to an electric signal bearing recording information of the stored radiation image, and the electric signal is amplified by an amplifier 209. The amplified output signal from the amplifier 209 is converted by an A/D converter 211 to a digital signal, which is then applied as a preliminary reading image signal Sp to a main reading control circuit 314 of the main reading unit 40. The main reading control circuit 314 determines a read-out gain setting a, a recording scale factor setting b, and a reproduced image processing condition setting c through histogram analysis, for example, based on the recording information represented by the preliminary reading image signal Sp.

When the preliminary reading mode is completed, the stimulable phosphor sheet 103 is fed into the main reading unit 40. In the main reading unit 40, a laser beam 302 emitted from a main reading laser source 301 passes through a filter 303 which cuts off the wavelength range of light which will be emitted from the stimulable phosphor sheet 103 upon exposure to the laser beam 302, and then is accurately adjusted in its diameter by a beam expander 304. The laser beam 302 is then linearly deflected in a main scanning direction by a light deflector 305 such as a galvanometer mirror, after which the laser beam 302 is reflected by a plane mirror 306 onto the stimulable phosphor sheet 103. Between the light deflector 305 and the plane mirror 306, there is disposed an $f\theta$ lens 307 for uniformizing the beam diameter of the laser beam 302 which scans the stimulable phosphor sheet 103. The stimulable phosphor sheet 103 is simultaneously fed for auxiliary scanning in the direction of the arrow 308 by a sheet feed means 320 such as feed rollers. As a result, the laser beam 302 is applied two-dimensionally to the entire surface of the stimulable phosphor sheet 103. When the laser beam 302 is applied to the stimulable phosphor sheet 103 in the main reading unit 40, the stimulable phosphor sheet 103 gives off light in an amount proportional to the amount of radiation energy stored therein, and the emitted light enters a main reading light guide 309. The light is guided by the light guide 309 while repeating total reflection therein to reach a light detector 310 such as a photomultiplier. The light detector 310 has a light detecting surface to which there is attached a filter that selectively passes only the wavelength range of the emitted light from the stimulable phosphor sheet 103. Therefore, the light detector 310 can detect only the light emitted from the stimulable phosphor sheet 103.

The light detector 310 photoelectrically detects the emitted light which represents the radiation image recorded on the stimulable phosphor sheet 103. The output signal of the light detector 310 is then amplified to an electric signal of a suitable level by an amplifier 311 with its read-out gain being set by the read-out gain setting a determined by the control circuit 314. The amplified electric signal is applied to an A/D converter 312 which coverts the signal to a digital signal with a recording scale factor suitable for a signal variation width based on the recording scale factor setting b. The digital signal is applied to a signal processing circuit 313. The signal processing circuit 313 processes the digital signal for image processing such as gradation processing, for example, based on the reproduced image processing condition setting c so that a well-observable radiation image can be reproduced.

A read-out image signal (main reading image signal) So issued from the signal processing circuit 313 is applied to a light modulator 401 of the image reproducing unit 50. In the image reproducing unit 50, a laser beam 403 emitted from a recording laser source 402 is modulated by the main reading image signal So from the signal processing circuit 313, and the modulated laser beam 403 is deflected by a scanning mirror 404 to scan a photosensitive sheet 405 such as a photographic film. In synchronism with the scanning by the modulated laser beam 403, the photosensitive sheet 405 is fed in a direction (indicated by the arrow 406) normal to the direction in which the phostosensitive sheet 405 is scanned by the modulated laser beam 403. Therefore, a radiation image based on the main reading image signal So is recorded on the photosensitive sheet 405. The radiation image may otherwise be reproduced by display on a CRT or in any of various other known ways.

Figure 5:
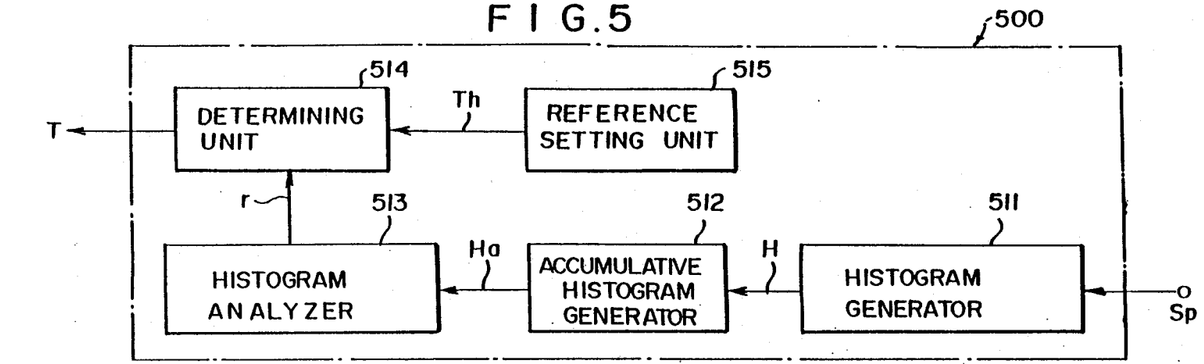
FIG. 5 is a block diagram of an apparatus for carrying out the first method of the present invention.

A method according to a first embodiment of the present invention for automatically determining the imaged posture of the object will now be described below. The preliminary reading image signal Sp issued from the A/D converter 211 is applied to an imaged posture determining circuit 500 as well as the main reading control circuit 314. FIG. 5 shows the imaged posture determining circuit 500 in detail. The imaged posture determining circuit 500 has a histogram generator 511 which, in response to the preliminary reading image signal Sp supplied thereto, generates a histogram of the image signal Sp. If the image recorded on the stimulable phosphor sheet 103 is the image of a chest, the histogram thus generated is as shown in FIG. 3A when the chest is imaged from its front side and as shown in FIG. 3B when the chest is imaged from its lateral side. The following description is directed to analysis of such chest images by way of example. Information H indicating the histogram is fed to an accumulative histogram generator 512 which generates an accumulative histogram of the preliminary reading image signal Sp based on the information H. The accumulative histogram thus produced is as shown in FIGS. 4A and 4B for the imaging of the chest from its front and lateral sides, respectively. InformaTion Ha representing the accumulative histogram is fed to a histogram analyzer 513 which determines the rate of change r of the accumulative histogram represented by the information Ha, in a region I (see FIGS. 4A and 4B) near a middle signal value Smid. The rate of change r may be defined by the value of $(\beta-\alpha)$ between the accumulative frequencies $\alpha, \beta$ at the ends of the region I. The region I may be defined between positions indicated by 40 % and 60 % of the image width from the minimum value Smin to the maximum value Smax of the preliminary reading image signal Sp, but may appropriately be defined otherwise dependent on the image to be analyzed, or may be confined to a point in the image. When generating the histogram, a histogram of the entire preliminary reading image signal Sp may be produced, or a histogram of other image signal than an image signal which is not directly related to the object, i.e., which comes from an area to which the radiation is directly applied (a blank area) may be produced, or a histogram area corresponding to the image signal coming from the blank area may be removed from a histogram of the entire preliminary reading image signal Sp. Stated otherwise, the histogram produced by in the method of the invention may be representative of the entire image signal, or a portion of the image signal. This is also the case with methods of other embodiments described later on.

Information indicating the rate of change r is then sent to a determining unit 514 which compares a reference value Th supplied from a reference setting unit 515 and the rate of change r. If r>Th, then the image borne by the preliminary reading image signal Sp is determined as a side chest image, and the determining unit 514 issues a corrective signal T. If r≦Th, then the image borne by the preliminary reading image signal Sp is determined as a front chest image, and the determining unit 514 issues no corrective signal. The corrective signal T is fed to a gain correcting circuit 507 shown in FIG. 1. In response to the corrective signal T, the gain correcting circuit 507 corrects the read-out gain setting a so that the read-out gain will be lowered. As described above, if the image reading conditions and the image processing conditions remain constant, the density at the area of the thoracic vertebra K of the side chest image is higher than that of the front chest image. When the rate of change r is relatively large, i.e., when the side chest image is read, the read-out gain is lowered to reduce the overall level of the main reading image signal So. Therefore, the entire density of the reproduced radiation image recorded on the photosensitive sheet 405 is lowered. As a result, the density at the area of the thoracic vertebra K in the reproduced side chest image is substantially equalized to the density at the area of the thoracic vertebra K in the reproduced front chest image. The degree to which the read-out gain may be corrected may be determined experimentally or empirically.

In the aforsaid embodiment, the front chest image is read at the read-out gain determined by the main reading control circuit 314, and the side chest image is read at the read-out gain which is corrected so as to be lower. Conversely, the side chest image may be read at the read-out gain determined by the main reading control circuit 314, and the front chest image may be read at the read-out gain which is corrected so as to be higher. (This also holds true for methods of other embodiments.) The density of the reproduced image may be adjusted by varying the read-out gain, as described above, and also by varying the conditions for the recording scale factor in the A/D converter 312, or varying the conditions for the gradation processing in the signal processing circuit 313. These alternative adjusting processes may be combined with each other. (This also holds true for methods according to other embodiments described below.)

The method of the first embodiment of the present invention may be used to determine other imaged postures than the imaged postures of front and side chest images, and also imaged postures of other body parts. More specifically, when a certain body part is imaged at different postures, it is highly likely for the rate of change of the accumulative histogram of the image signal of one of the body part images to vary greatly from the rate of change of the accumulative histogram of the image signal of the other body part image in a certain area in the image. The imaged postures can therefore be determined by detecting the magnitude of the rate of change.

Figure 6:
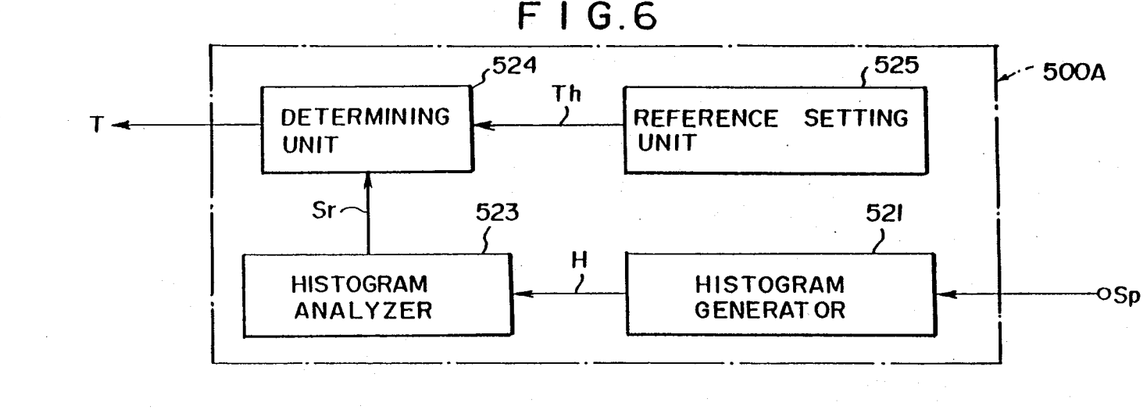
FIG. 6 is a block diagram of an apparatus for carrying out a second method of the present invention.
Figure 7:
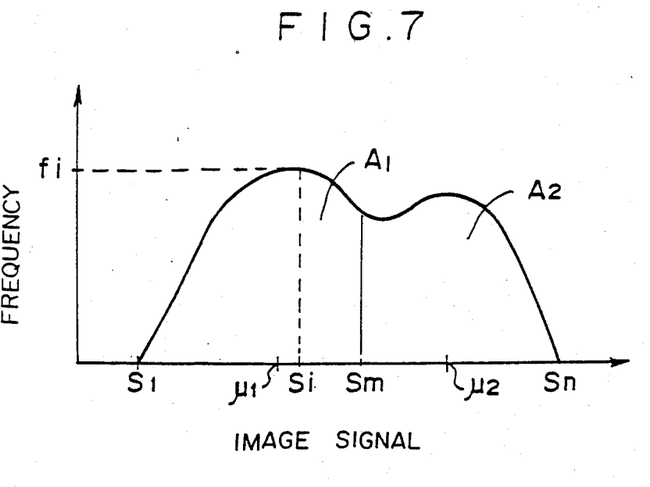
FIG. 7 is a graph explaining class separation in the second method.

A method according to a second embodiment will be described below. FIG. 6 shows in detail an imaged posture determining circuit 500A which can be used in the system of FIG. 1 in place of the imaged posture determining circuit 500 shown in FIG. 5. The imaged posture determining circuit 500A has a histogram generator 521 which, in response to the preliminary reading image signal Sp supplied thereto, generates a histogram of the image signal Sp. If the image recorded on the stimulable phosphor sheet 103 is the image of a chest, the histogram thus generated is as shown in FIG. 3A when the chest is imaged from its front side and as shown in FIG. 3B when the chest is imaged from its lateral side, as with the method of the first embodiment. The following description is directed to analysis of such chest images by way of example. Information H indicating the histogram is fed to a histogram analyzer 523 which determines the maximum value Rmax of class separation R used in determination analysis as the separation of the histogram represented by the information H. There is established a point Sm by which the entire values of the signal in the histogram are divided into two lower and higher groups or areas A1, A2, and it is assumed that the ratios of the accumulated frequency values in the areas A1, A2 are indicated by w1, w2, (w1+w2=1), the average weighting values for the signal in the areas A1, A2 are indicated by μ1, μ2, and the dispersion of the entire histogram is expressed by σ2. The maximum value Rmax of class separation R can be defined by the maximum value of:

$$R = w1w2(\|1-\mu 2)^2/\sigma^2$$

which varies according to m. The average signal values μ1, μ2 are given by:

$$\mu 1 = \frac{1}{\sum_{i=1}^{m} \cdot fi} \sum_{i=1}^{m} \cdot Si \cdot fi$$

$$\mu 2 = \frac{1}{\sum_{i=m+1}^{n} \cdot fi} \sum_{i=m+1}^{n} \cdot Si \cdot fi$$

where Si is the signal value and fi is the frequency.

Information Sr indicating the maximum value Rmax of class separation R is then sent to a determining unit 524 which compares a reference value Th supplied from a reference setting unit 525 and the maximum value Rmax. If Rmax≦Th, then the image borne by the preliminary reading image signal Sp is determined as a side chest image, and the determining unit 524 issues a corrective signal T. If Rmax>Th, then the image borne by the preliminary reading image signal Sp is determined as a front chest image, and the determining unit 524 issues no corrective signal. The corrective signal T is fed to the gain correcting circuit 507 shown in FIG. 1. As with the first embodiment, in response to the corrective signal T, the gain correcting circuit 507 corrects the read-out gain setting a so that the read-out gain will be lowered. When the class separation R is relatively small, i.e., when the side chest image is read, the read-out gain is lowered to lower the overall level of the main reading image signal So. Therefore, the entire density of the reproduced radiation image recorded on the photosensitive sheet 405 is lowered. As a result, the density at the area of the thoracic vertebra K in the reproduced side chest image is substantially equalized to the density at the area of the thoracic vertebra K in the reproduced front chest image.

The separation of the histogram may be defined by a correlative standard or a least square standard rather than the class separation.

The method of the second embodiment of the present invention may be used to determine other imaged postures than the imaged postures of front and side chest images, and also imaged postures of other body parts. More specifically, when a certain body part is imaged at different postures, it is highly likely for the separation of the histogram of the image signal of one body part image to vary greatly from the separation of the histogram of the image signal of the other body part image. The imaged postures can therefore be determined by determining the magnitude of the separation.

Figure 9:
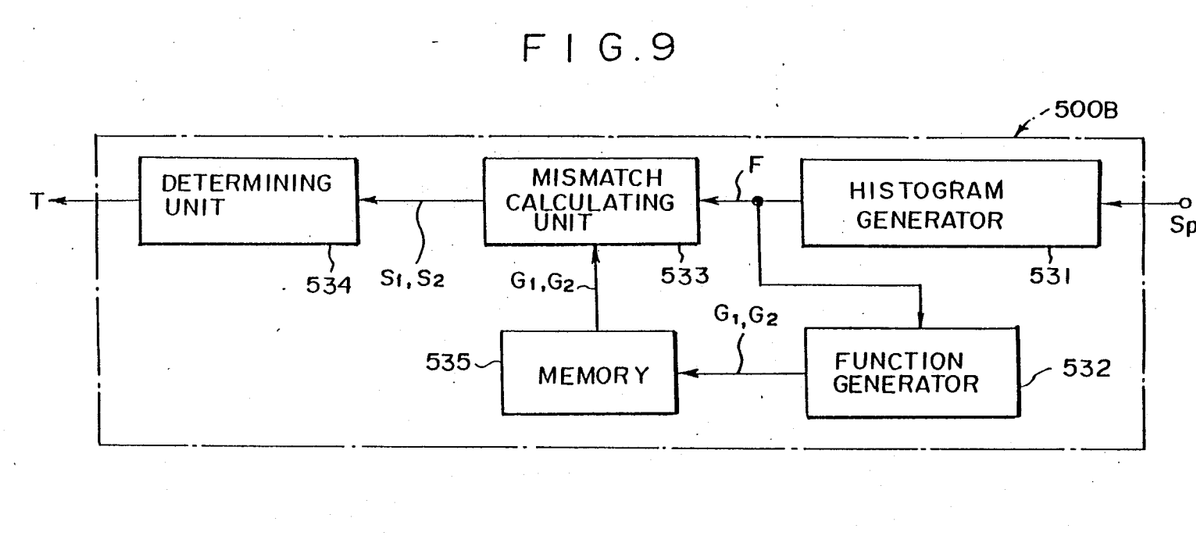
FIG. 9 is a block diagram of an apparatus for carrying out the third method of the present invention.

A method according to a third embodiment will be described below. FIG. 9 shows an imaged posture determining circuit 500B which can be used in the system of FIG. 1 in place of the imaged posture determining circuit 500 shown in FIG. 5. The imaged posture determining circuit 500B has a histogram generator 531 which, in response to the preliminary reading image signal Sp supplied thereto, generates a histogram of the image signal Sp. If the image recorded on the stimulable phosphor sheet 103 is the image of a chest, the histogram thus generated is generally of a pattern as shown in FIG. 3A when the chest is imaged from its front side and as shown in FIG. 3B when the chest is imaged from its lateral side, as with the method of the first embodiment. The following description is directed to analysis of such chest images by way of example.

Figure 8A:
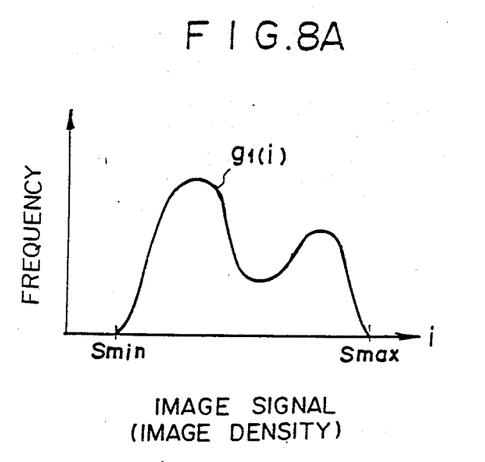
FIGS. 8A and 8B are graphs showing density basic patterns of histograms of image signals read from stimulable phosphor sheets recording images of an object imaged at different postures, and also showing functions according to a third method of the present invention.
Figure 8B:
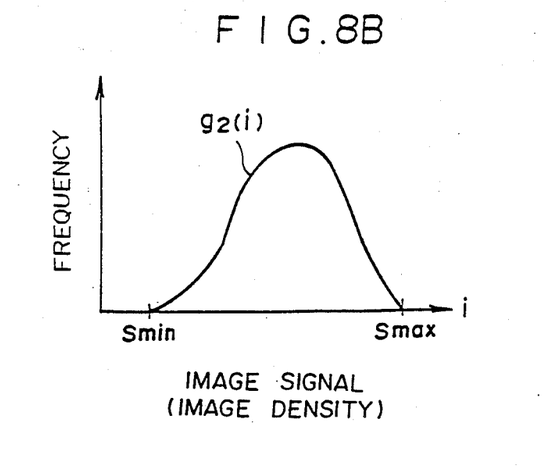

The general histogram patterns shown in FIGS. 3A and 3B can be determined by producing histograms of preliminary reading image signals Sp relative to several typical front and side chest images with the histogram generator 531, and sending the histograms to a function generator 532 by which the histograms are averaged and smoothed. The function generator 532 produces functions g1(i), g2(i) which approximate the typical histograms thus produced (see FIGS. 8A and 8B). (i indicates an image signal value.) The functions can be generated as being composed of a multinomial of higher degree by using, for example, the regression analysis process. The functions g1(i), g2(i) are stored in a memory means 535 as indicating reference histogram patterns of the front and side chest images.

Figure 8C:
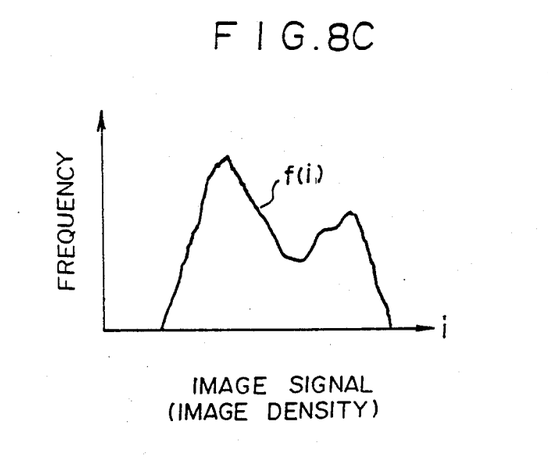
FIG. 8C is a graph showing, by way of example, a histogram of an actual image signal.

For determining the imaged posture of each of radiation images, the histograms of the preliminary reading image signals Sp of the radiation images are sequentially produced in the histogram generator 531. The actual histogram of each image is as shown in FIG. 8C, for example, and can be defined as a function f(i) of the image signal i. Information F indicating the function f(i) is then delivered to a mismatch calculating unit 533, which finds the degree of a mismatch between a histogram of a preliminary reading image signal Sp which is produced for each image and the above two reference histograms. More specifically, when supplied with the information F, the mismatch calculating unit 533 receives items of information G1, G2 indicating the functions g1(i), g2(i) from the memory means 535, and determines the degrees of mismatches according the following equations:

$$S1 = \sum_{i=1}^{N} \{f(i) - g1(i)\}^2$$

$$S2 = \sum_{i=1}^{N} \{f(i) - g2(i)\}^2$$

The information thus determined as indicating the mismatch degrees S1, S2 is then sent to a determining unit 534.

If S1>S2, then the determining unit 544 determines that the image borne by the preliminary reading image signal Sp is a side chest image, and issues a corrective signal T. If S1<S2, then the image borne by the preliminary reading image signal is judged as a front chest image, and no corrective signal is issued. More specifically, if S1<S2, the degree of a mismatch between the functions f(i) and the function g1(i) is smaller than the degree of a mismatch between the functions f(i) and the function g2(i). Stated otherwise, the function f(i) matches the function g1(1) better than the function g2(i). Therefore, the pattern of the histogram produced by the preliminary reading image signal Sp can be judged as better matching the reference histogram pattern of FIG. 3A than the reference histogram pattern of FIG. 3B.

The corrective signal T is fed to the gain correcting circuit 507 shown in FIG. 1. In response to the corrective signal T, the gain correcting circuit 507 corrects the read-out gain setting a so that the read-out gain will be lowered, as with the first embodiment. When S1>S2, i.e., when the side chest image is read, the read-out gain is lowered to reduce the overall level of the main reading image signal So. Therefore, the entire density of the reproduced radiation image recorded on the photosensitive sheet 405 is lowered. As a result, the density at the area of the thoracic vertebra K in the reproduced side chest image is substantially equalized to the density at the area of the thoracic vertebra K in the reproduced front chest image.

The mismatch degree may also be defined as $$S = \sum_{i=1}^{N} |f(i) - g(i)|, \text{ or}$$

the maximum value from the group of f(1)-g(1), f(2)-g(2), ... f(N)-g(N).

The method of the third embodiment of the present invention may be used to determine other imaged postures than the imaged postures of front and side chest images, and also imaged postures of other body parts. More specifically, when a certain body part is imaged at different postures, it is highly likely for the histogram patterns of the image signals of the body part images to have mutually different basic patterns. Therefore, the matching degree between those basic histogram patterns and the histogram pattern of an actual image signal is determined, and the imaged postures can be determined according to the determined matching degree.

Figure 10:
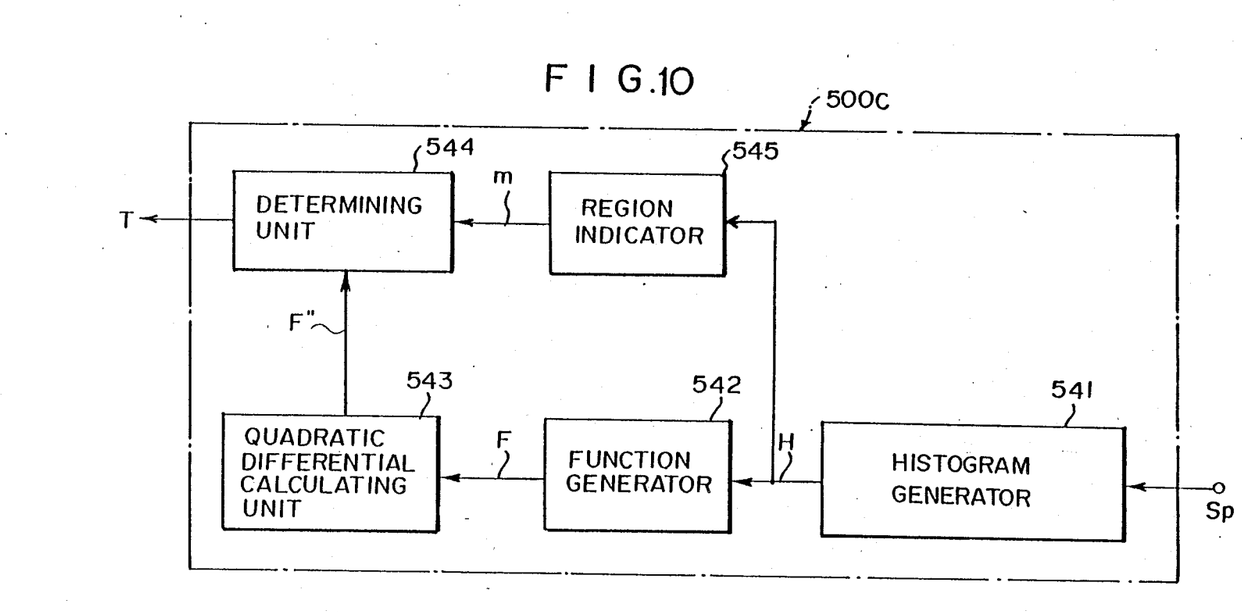
FIG. 10 is a block diagram of an apparatus for carrying out a fourth method of the present invention.

A method according to a fourth embodiment will be described below. FIG. 10 shows an imaged posture determining circuit 500C which can be used in the system of FIG. 1 in place of the imaged posture determining circuit 500 shown in FIG. 5. The imaged posture determining circuit 500C has a histogram generator 541 which, in response to the preliminary reading image signal Sp supplied thereto, generates a histogram of the image signal Sp. If the image recorded on the stimulable phosphor sheet 103 is the image of a chest, the histogram thus generated is as shown in FIG. 3A when the chest is imaged from its front side and as shown in FIG. 3B when the chest is imaged from its lateral side, as with the method of the first embodiment. The following description is directed to analysis of such chest images by way of example. Information H representing the histogram is sent to a function generator 542 which produces a function f(S) that approximates the pattern of the histogram indicated by the information H. The function f(S) can be generated as being composed of a multinomial of higher degree by using, for example, the regression analysis process. Information F representing the function f(S) is then supplied to a quadratic differential calculating unit 543, which quadratically differentiates the function f(S) to find a derivative of second order f''(S). Information F'' indicative of the derivative of second order f''(S) is sent to a determining unit 544.

The determining unit 544 is connected to a region indicator 545 which is supplied with the histogram information H. The region indicator 545 finds a middle signal value Smid (see FIGS. 3A and 3B) of the histogram based on the information H. Information m indicating the middle signal value Smid is then delivered to the determining unit 544. The determining unit 544 determines a value f''(Smid) which the derivative of second order f''(S) takes at the middle signal value Sm. If the value of f''(Smid) is negative, then the determining unit 544 determines that the image borne by the preliminary reading image signal Sp is a side chest image, and issues a corrective signal T. If the value of f''(Smid) is positive, then the image borne by the preliminary reading image signal is judged as a front chest image, and no corrective signal is issued. The corrective signal T is fed to the gain correcting circuit 507 shown in FIG. 1. In response to the corrective signal T, the gain correcting circuit 507 corrects the read-out gain setting a so that the read-out gain will be lowered, as with the first embodiment. When the value of f''(Smid) is negative, i.e., when the side chest image is read, the read-out gain is lowered to reduce the overall level of the main reading image signal So. Therefore, the entire density of the reproduced radiation image recorded on the photosensitive sheet 405 is lowered. As a result, the density at the area of the thoracic vertebra K in the reproduced side chest image is substantially equalized to the density at the area of the thoracic vertebra K in the reproduced front chest image.

The value to be put in the derivative of second order f''(S) is not limited to the middle signal value Smid, but may appropriately be selected according to a typical histogram pattern of an image to be analyzed.

The method of the fourth embodiment of the present invention may be used to determine other imaged postures than the imaged postures of front and side chest images, and also imaged postures of other body parts. More specifically, when a certain body part is imaged at different postures, it is highly likely for the histogram pattern of the image signal of one of the body part images to be downwardly convex and for the histogram pattern of the image signal of the other body part image to be upwardly convex in a certain region. Therefore, the imaged postures can be determined according to the sign of the derivative of second order in this region.

A method according to a fifth embodiment of the present invention will be described below. The method of the fifth embodiment determines an imaged posture by checking whether a histogram of the preliminary reading image signal Sp in the system of FIG. 1 is of a double-hump form as shown in FIG. 3A or of a single-peak form as shown in FIG. 3B. Whether a generated histogram is of a double-hump form or a single-peak form can be ascertained by, for example, the circuit 500 shown in FIG. 5. More specifically, in the circuit 500, information representative of the rate of change r (FIGS. 4A and 4B) of the accumulative histogram indicated by the information Ha in the region I near the middle signal value Smid is fed to the determining unit 514. The determining unit 512 then compares the rate-of-change r and the reference value Th from the reference setting unit 515. If r>Th, then the histogram is judged as being of a single-peak form, i.e., the image borne by the preliminary reading image signal Sp is judged as a side chest image, and a corrective signal T is issued. If r<Th, then the histogram is judged as being of a double-hump form, i.e., the image borne by the preliminary reading image signal Sp is judged as a front chest image, and no corrective signal is issued. If the histogram of the preliminary reading image signal Sp is of a double-hump shape as shown in FIG. 3A and the signal frequency in the vinicity of the middle signal value Smid is low, the rate of change r near the middle signal value of the accumulative histogram is relatively small. On the other hand, if the histogram of the preliminary reading image signal Sp is of a single-peak shape as shown in FIG. 3B and the signal frequency in the vicinity of the middle signal value Smid is high, the rate of change r near the middle signal value of the accumulative histogram is relatively large. Therefore, imaged postures can be determined on the basis of the value of the rate of change r.

The corrective signal T is fed to the gain correcting circuit 507 shown in FIG. 1. In response to the corrective signal T, the gain correcting circuit 507 corrects the read-out gain setting a so that the read-out gain will be lowered, as with the first embodiment.

In the above fifth embodiment, whether a signal distribution pattern is of a single-peak form or a double-hump form is detected from the rate of change of the accumulative histogram in a certain region. However, the histogram pattern can be judged in another way. For example, where a histogram is of a double-hump form as illustrated in FIG. 3A, the pattern of the histogram is downwardly convex near the middle signal value Smid. Where a histogram is of a single-peak form as illustrated in FIG. 3B, the histogram pattern is upwardly convex near the middle signal value Smid. Therefore, whether a historam pattern is of a double-hump form or a signle-peak form can be detected by checking whether the histogram pattern is downwardly convex or upwardly convex in the vicinity of the middle signal value Smid. The direction in which the histogram pattern is convex can be determined by having the histogram pattern approximate a certain function, and checking whether the derivative of second order of such a function is positive or negative.

Whether a histogram pattern is of a single-peak form or a double-hump form can be detected by the circuit 500C shown in FIG. 10. In the circuit 500C, the determining unit 544 determines a value f''(Smid) which the derivative of second order f''(S) takes at the middle signal value Smid. If the value of f''(Smid) is negative, then the determining unit 544 determines that the histogram is judged as being of a single-peak form, i.e., the image borne by the preliminary reading image signal Sp is a side chest image. If the value of f''(Smid) is positive, then the histogram is judged as being of a double-hump form, i.e., the image borne by the preliminary reading image signal is judged as a front chest image.

Whether the histogram pattern is of a single-peak form or a double-hump form may also be detected by determining the dispersion or separation of the histogram or by a known pattern matching process.

FIGS. 3A and 3B show smoothed forms of actual signal distribution patterns. Generally, an actual signal distribution pattern has small changes or fluctuations which are not illustrated in FIGS. 3A and 3B. The terms "single-peak form" and "double-hump form" used above are indicative of basic histogram patterns irrespective of such small changes or fluctuations which the actual patterns have.

The method of the fifth embodiment may be used to determine other imaged postures than the imaged postures of front and side chest images, and also imaged postures of other body parts. More specifically, when a certain body part is imaged at different postures, it is highly likely for the histogram pattern of the image signal of one body part image to be of a single-peak form and for the histogram pattern of the image signal of the other body part image to be of a double-hump form. Therefore, the imaged postures can be determined by detecting whether the histogram patterns are of a single-peak form or a double-hump form.

Figure 13:
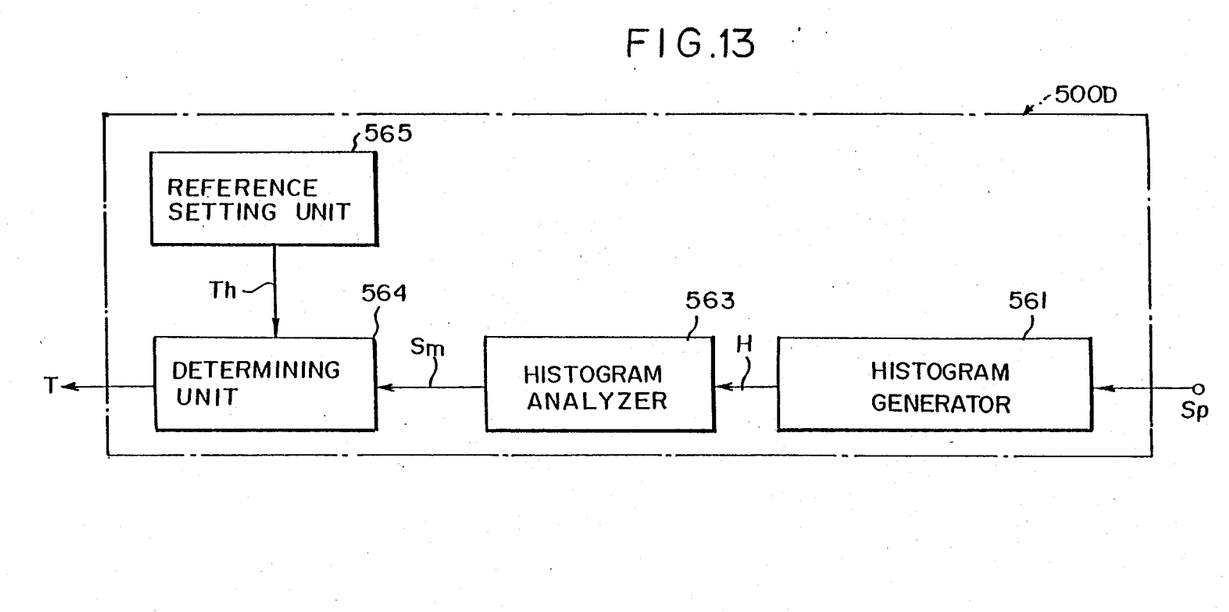
FIG. 13 is a block diagram of an apparatus for carrying out a sixth method of the present invention.

A method according to a sixth embodiment will be described below. FIG. 13 shows in detail an imaged posture determining circuit 500D which can be used in the system of FIG. 1 in place of the imaged posture determining circuit 500 shown in FIG. 5. The imaged posture determining circuit 500D has a histogram generator 561 which, in response to the preliminary reading image signal Sp supplied thereto, generates a histogram of the image signal Sp. If the image recorded on the stimulable phosphor sheet 103 is the image of a foot, the histogram thus generated is as shown in FIG. 12A when the foot is imaged from its front side and as shown in FIG. 12B when the foot is imaged from its lateral side. The following description is directed to analysis of such foot images by way of example. Information H indicating the histogram is fed to a histogram analyzer 563 which determines the dispersion $\sigma^2$ of the histogram represented by the information H. As is well known, the dispersion $\sigma^2$ is expressed by:

$$\sigma^2 = \frac{1}{N} \sum_{i=1}^{n} (Si - \bar{S})^2 fi \left( N = \sum_{i=1}^{n} fi \right)$$

where Si is the value of the signal, fi is the frequency, and $\bar{S}$ is the average signal value. The dispersion $\sigma^2$ may be determined from the entire area of the histogram, or determined with respect to an image signal in a region I (see FIGS. 12A and 12B) except the image signal of an area where the radiation is directly applied (blank area).

Information Sm indicating the dispersion $\sigma^2$ is then sent to a determining unit 564 which compares a reference value Th supplied from a reference setting unit 565 and the dispersion $\sigma^2$. If $\sigma^2 < Th$, then the image borne by the preliminary reading image signal Sp is determined as a side foot image, and the determining unit 564 issues a corrective signal T. If $\sigma^2 \geq Th$, then the image borne by the preliminary reading image signal Sp is determined as a front foot image, and the determining unit 564 issues no corrective signal. The corrective signal T is fed to the gain correcting circuit 507 shown in FIG. 1. As with the first embodiment, in response to the corrective signal T, the gain correcting circuit 507 corrects the read-out gain setting a so that the read-out gain will be lowered. As described above, provided the image reading conditions and the image reading conditions are constant, the density of the joint J in the reproduced side foot image is lower than the density of the joint in the reproduced front foot image. When the dispersion $\sigma^2$ is relatively small, i.e., when the side foot image is read, the read-out gain is increased to lower the overall level of the main reading image signal So. Therefore, the entire density of the reproduced radiation image recorded on the photosensitive sheet 405 is increased. As a result, the density at the area of the joint J in the reproduced side foot image is substantially equalized to the density at the area of the joint J in the reproduced front foot image.

The method of the sixth embodiment of the present invention may be used to determine other imaged postures than the imaged postures of front and side foot images, and also imaged postures of other body parts. More specifically, when a certain body part is imaged at different postures, it is highly likely for the dispersion $\sigma^2$ of the histogram of the image signal of one body part image to vary greatly from the dispersion $\sigma^2$ of the histogram of the image signal of the other body part image. The imaged postures can therefore be determined by determining the magnitude of the dispersion $\sigma^2$.

In each of the above embodiments, an imaged posture is determined by employing the preliminary reading image signal. In the event that no preliminary reading mode is carried out and image processing conditions are set in the signal processing circuit 313 based on the main reading image signal So, an imaged posture may be determined using the main reading image signal So. While the density of a reproduced image is corrected dependent on the determined imaged posture, an imaged posture may be determined to serve other purposes.

In each of the aforesaid embodiments, the imaged posture of an image recorded on the stimulable phosphor sheet 103. However, the principles of the present invention are not limited to the determination of the imaged posture of a radiation image recorded on the stimulable phosphor sheet 103, but are also applicable to the determination of the imaged postures of other images taken in medical imaging systems.

According to the method of the present invention, the imaged posture of an image taken for medical diagnosis can automatically and accurately be determined. By carrying out the method of the invention in a radiation image information recording and reproducing system, as described above, the densities of areas of interest in reproduced images of an object can be uniformized even if the object is imaged at different postures, with the result that the radiation images can smoothly and accurately be diagnosed.

Although certain preferred embodiments have been shown and described, it should be understood that many changes and modifications may be made therein without departing from the scope of the appended claims.

We claim:

1. A method of determining the imaged posture of a medical image, comprising the steps of:
   (i) generating an accumulative histogram defining cumulative distributions of image signals bearing a transmitted image of a human body;
   (ii) determining a rate of change of said accumulative histogram in a predetermined region thereof; and
   (iii) determining the imaged posture of said image based on said rate of change.

2. A method of determining the imaged posture of a medical image, comprising the steps of:
   (i) generating a histogram of an image signal bearing a transmitted image of a human body;
   (ii) determining the separation of said histogram; and
   (iii) determining the imaged posture of said image based on said separation.

3. A method of determining the imaged posture of a medical image, comprising the steps of:
   (i) generating a histogram of an image signal bearing a transmitted image of a human body;
   (ii) determining the degree of matching between a pattern of said histogram and a plurality of reference image signal histogram patterns predefined of imaged postures of the image; and
   (iii) determining the imaged posture of said image based on said degree of matching.

4. A method of determining the imaged posture of a medical image, comprising the steps of:
   (i) generating a histogram of an image signal bearing a transmitted image of a human body;
   (ii) determining a function approximating a pattern of said histogram;
   (iii) thereafter, determining a derivative of second order of said function;
   (iv) checking whether said derivative of second order is of a positive or negative value in a predetermined section of the histogram, the section corresponding to a region in the image; and
   (v) determining the imaged posture of said image based on whether said derivative of second order is of a positive or negative value.

5. A method of determining the imaged posture of a medical image, comprising the steps of:
   (i) generating a histogram of an image signal bearing a transmitted image of a human body;
   (ii) detecting whether said histogram is basically of a single-peak form or a double-hump form; and
   (iii) determining the imaged posture of said image based on whether said histogram is basically of a single-peak form of a double-hump form.

6. A method of determining the imaged posture of a medical image, comprising the steps of:
   (i) generating a histogram of an image signal bearing a transmitted image of a human body;
   (ii) determining the dispersion of said histogram; and
   (iii) determining the imaged posture of said image based on said dispersion.

* * * * *